United States Patent
Kim et al.

(10) Patent No.: US 11,057,082 B2
(45) Date of Patent: *Jul. 6, 2021

(54) METHOD AND APPARATUS FOR TRANSMITTING AND RECEIVING CHANNEL STATE INFORMATION IN WIRELESS COMMUNICATION SYSTEM

(71) Applicant: Samsung Electronics Co., Ltd., Gyeonggi-do (KR)

(72) Inventors: Younsun Kim, Gyeonggi-do (KR); Hyojin Lee, Gyeonggi-do (KR); Hyoungju Ji, Seoul (KR); Juho Lee, Gyeonggi-do (KR); Joonyoung Cho, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/852,985

(22) Filed: Apr. 20, 2020

(65) Prior Publication Data

US 2020/0252110 A1 Aug. 6, 2020

Related U.S. Application Data

(63) Continuation of application No. 16/102,254, filed on Aug. 13, 2018, now Pat. No. 10,630,351, which is a (Continued)

(30) Foreign Application Priority Data

Sep. 18, 2012 (KR) .......... 10-2012-0103431
Oct. 12, 2012 (KR) .......... 10-2012-0113608

(51) Int. Cl.
*H04B 7/0417* (2017.01)
*H04B 7/06* (2006.01)
(Continued)

(52) U.S. Cl.
CPC ......... *H04B 7/0417* (2013.01); *H04B 7/0469* (2013.01); *H04B 7/065* (2013.01);
(Continued)

(58) Field of Classification Search
CPC .......................... H04B 7/0469; H04B 7/0417
See application file for complete search history.

(56) References Cited

U.S. PATENT DOCUMENTS 9,294,168 B2 * 3/2016 Kim ............... H04B 7/0469
9,451,589 B2 * 9/2016 Nishio ............... H04B 7/024
(Continued)

FOREIGN PATENT DOCUMENTS

CN 101877627 11/2010
CN 102291223 12/2011
(Continued)

OTHER PUBLICATIONS

Chinese Office Action dated Sep. 1, 2020 issued in counterpart application No. 201811098715.X, 15 pages.
(Continued)

*Primary Examiner* — Jae Y Lee
*Assistant Examiner* — Andrew C Lee
(74) *Attorney, Agent, or Firm* — The Farrell Law Firm, P.C.

(57) ABSTRACT

A method by a terminal, a method by a base station, a terminal, and a base station are provided. The method by the terminal includes receiving a first channel state information reference signal (CSI-RS) and a second CSI-RS from a base station; generating channel state information (CSI) based on both the first CSI-RS and the second CSI-RS; and reporting the CSI to the base station, wherein the CSI includes a rank indicator (RI) and a channel quality indicator (CQI).

20 Claims, 14 Drawing Sheets

Related U.S. Application Data continuation of application No. 15/075,524, filed on Mar. 21, 2016, now Pat. No. 10,050,682, which is a continuation of application No. 14/030,545, filed on Sep. 18, 2013, now Pat. No. 9,294,168.

(51) Int. Cl.
*H04L 5/00* (2006.01)
*H04B 7/0456* (2017.01)

(52) U.S. Cl.
CPC ......... *H04B 7/0626* (2013.01); *H04L 5/0048* (2013.01); *H04B 7/063* (2013.01); *H04B 7/0632* (2013.01); *H04B 7/0639* (2013.01); *H04L 5/0053* (2013.01); *H04L 5/0057* (2013.01)

(56) References Cited

U.S. PATENT DOCUMENTS

| | | | | |
|---|---|---|---|---|
| 10,050,682 | B2* | 8/2018 | Kim | H04L 5/0048 |
| 2011/0141987 | A1 | 6/2011 | Nam et al. | |
| 2011/0194551 | A1* | 8/2011 | Lee | H04B 7/0626 370/342 |
| 2012/0076024 | A1 | 3/2012 | Ko et al. | |
| 2012/0106388 | A1* | 5/2012 | Shimezawa | H04L 5/0007 370/252 |
| 2012/0213095 | A1 | 8/2012 | Krishnamurthy et al. | |
| 2012/0213111 | A1 | 8/2012 | Shimezawa et al. | |
| 2012/0287875 | A1* | 11/2012 | Kim | H04W 76/27 370/329 |
| 2013/0039203 | A1* | 2/2013 | Fong | H04B 7/024 370/252 |
| 2013/0058307 | A1 | 3/2013 | Kim et al. | |
| 2013/0094384 | A1* | 4/2013 | Park | H04L 5/0053 370/252 |
| 2013/0094464 | A1 | 4/2013 | Li et al. | |
| 2013/0100922 | A1 | 4/2013 | Ahn et al. | |
| 2013/0148515 | A1* | 6/2013 | Ribeiro | H04L 5/0048 370/252 |
| 2013/0194943 | A1* | 8/2013 | Davydov | H04L 12/189 370/252 |
| 2013/0258992 | A1 | 10/2013 | Seo et al. | |
| 2013/0272151 | A1 | 10/2013 | Thomas et al. | |
| 2013/0286884 | A1* | 10/2013 | Li | H04B 7/0417 370/252 |
| 2013/0301465 | A1* | 11/2013 | Seo | H04B 7/0626 370/252 |
| 2013/0308715 | A1 | 11/2013 | Nam et al. | |
| 2013/0315337 | A1 | 11/2013 | Dai et al. | |
| 2013/0316719 | A1 | 11/2013 | Mazzarese et al. | |
| 2013/0322361 | A1 | 12/2013 | Ko et al. | |
| 2013/0329664 | A1 | 12/2013 | Kim et al. | |
| 2014/0044109 | A1* | 2/2014 | Nogami | H04W 72/085 370/336 |
| 2014/0126433 | A1 | 5/2014 | Yang et al. | |
| 2014/0133336 | A1 | 5/2014 | Park et al. | |
| 2014/0192762 | A1 | 7/2014 | Li et al. | |
| 2014/0241454 | A1 | 8/2014 | Kim et al. | |
| 2014/0247748 | A1 | 9/2014 | Kang et al. | |
| 2014/0315563 | A1* | 10/2014 | Guo | H04L 5/0057 455/450 |
| 2015/0071187 | A1 | 3/2015 | Chen et al. | |
| 2015/0078472 | A1 | 3/2015 | Vook et al. | |
| 2015/0222340 | A1 | 8/2015 | Nagata et al. | |
| 2015/0229375 | A1* | 8/2015 | Vook | H04L 5/0014 370/329 |
| 2015/0272250 | A1* | 10/2015 | Chen | A41G 1/007 428/20 |

FOREIGN PATENT DOCUMENTS

| | | |
|---|---|---|
| CN | 102624495 | 8/2012 |
| EP | 2 587 685 | 5/2013 |
| EP | 2 665 203 | 11/2013 |
| JP | 2011-082603 | 4/2011 |
| JP | 2014-053811 | 3/2014 |
| WO | WO 2011/155763 | 12/2011 |
| WO | WO 2011/162520 | 12/2011 |
| WO | WO 2012/086998 | 6/2012 |
| WO | WO 2012/094930 | 7/2012 |
| WO | WO 2012/109989 | 8/2012 |
| WO | WO 2012/112281 | 8/2012 |
| WO | WO 2013/144361 | 10/2013 |
| WO | WO 2013/144365 | 10/2013 |
| WO | WO 2013/187669 | 12/2013 |

OTHER PUBLICATIONS

Alcatel-Lucent et al., "Considerations on CSI Feedback Enhancements for High-Priority Antenna Configurations", R1-112420, 3GPP TSG-RAN WG1 #66, Aug. 22-26, 2011.
Samsung, "CoMP RRC Parameters", R1-122243, 3GPP TSG RAN WG1 #69, May 21-25, 2012.
NTT Docomo et al., "CSI RS Configuration to Support 4 Tx MIMO UE in 8 Tx Networks", R1-110861, 3GPP TSG RAN WG1 Meeting #64, Feb. 21-25, 2011.
European Search Report dated Jan. 4, 2017 issued in counterpart application No. 13838422.7-1874, 7 pages.
European Search Report dated Jun. 27, 2016 issued in counterpart application No. 13838422.7-1874, 7 pages.
Japanese Office Action dated Aug. 21, 2017 issued in counterpart application No. 2015-531872, 25 pages.
3rd Generation Partnership Project; Technical Specification Group Radio Access Network; Evolved Universal Terrestrial Radio Access (E-UTRA); Physical Layer Procedures (Release 10), 3GPP TS 36.213 V10.6.0, Jun. 26, 2012, 4 pages.
Japanese Pre-Appeal Examination Report dated May 27, 2019 issued in counterpart application No. 2015-531872, 5 pages.

* cited by examiner

METHOD AND APPARATUS FOR TRANSMITTING AND RECEIVING CHANNEL STATE INFORMATION IN WIRELESS COMMUNICATION SYSTEM

PRIORITY

This application is a Continuation of U.S. patent application Ser. No. 16/102,254 filed in the U.S. Patent and Trademark Office on Aug. 13, 2018, which is a Continuation of and claims benefit under 35 U.S.C. § 120 to U.S. patent application Ser. No. 15/075,524 filed in the U.S. Patent and Trademark Office on Mar. 21, 2016 and issued on Aug. 14, 2018 as U.S. patent Ser. No. 10/050,682, which is a Continuation of and claims benefit under 35 U.S.C. § 120 to U.S. patent application Ser. No. 14/030,545 filed in the U.S. Patent and Trademark Office on Sep. 18, 2013 and issued on Mar. 22, 2016 as U.S. Pat. No. 9,294,168, which claims priority under 35 U.S.C. § 119(a) to applications filed in the Korean Intellectual Property Office on Sep. 18, 2012 and Oct. 12, 2012, and assigned Serial Nos. 10-2012-0103431 and 10-2012-0113608, respectively, the contents of each of which are incorporated herein by reference.

BACKGROUND

1. Field

The present disclosure relates generally to a channel state information transmission/reception method and apparatus and, more particularly, to a method and apparatus for transmitting and receiving channel state information in a wireless communication system supporting a plurality of antennas.

2. Description of the Related Art

A Reference Signal (RS) is used to measure the channel state (or quality) between a base station and users (such as, for example, signal strength and distortion, interference strength, and Gaussian noise), and is used in demodulation and decoding of a received data symbol in a wireless mobile communication system. The reference signal is also to measure a radio channel state. The receiver measures the strength of the reference signal transmitted by the transmitter at a predetermined transmit power to determine the radio channel state between the receiver and the transmitter. The receiver sends a request to the transmitter for a data rate based on the determined radio channel state.

The $3^{rd}$ generation evolved mobile communication standards such as, for example, the $3^{rd}$ Generation Partnership Project Long Term Evolution-Advanced (3GPP LTE-A) and Institute of Electrical and Electronics Engineers (IEEE) 802.16m, adopt a multi-carrier multiple access technique such as Orthogonal Frequency Division Multiplexing (Multiple Access) (OFDM(A)). In the case of a multi-carrier multiple access-based wireless mobile communication system, the channel estimation and measurement performance is influenced by the number of symbols and the number of subcarriers to which the reference signal is mapped on the time-frequency resource grid. The channel estimation and measurement performance is also influenced by the power allocated for reference signal transmission. Accordingly, by allocating more radio resources (including time, frequency, and power), it is possible to improve channel estimation and measurement performance, resulting in improved received data symbol demodulation and decoding performance and channel state measurement accuracy.

In a resource-constrained mobile communication system, however, if the radio resource is allocated for transmitting resource signals, the resource amount for data signal transmission is reduced. For this reason, the resource amount for the reference signal transmission is determined by taking the system throughput into account. Particularly, in a Multiple Input Multiple Output (MIMO) system including a plurality of antennas, a key issue is how to design and measure reference signals.

SUMMARY

The present disclosure has been made to address at least the above problems and/or disadvantages and to provide at least the advantages described below. Accordingly, an aspect of the present disclosure provides a method and apparatus for efficiently transmitting/receiving channel state information.

Another aspect of the present disclosure provides a method and apparatus for efficiently transmitting/receiving the channel state information when using a plurality of antennas.

In accordance with an aspect of the present disclosure, a method is provided for reporting channel state information (CSI) performed by a terminal in a communication system. The method includes receiving, from a base station, CSI configuration information including configurations on a first channel state information reference signal (CSI-RS), a second CSI-RS, and a CSI-interference measurement (CSI-IM) and configuration for a CSI feedback associated with the first CSI-RS, the second CSI-RS and the CSI-IM; receiving, from the base station, the first CSI-RS and the second CSI-RS based on the configurations on the first CSI-RS and the second CSI-RS; generating the CSI based on the configuration for the CSI feedback, and the first CSI-RS, the second CSI-RS and the CSI-IM; and reporting, to the base station, the CSI including at least one of a rank indicator (RI), a precoding matrix indicator (PMI), or a channel quality indicator (CQI), with the first CSI-RS and the second CSI-RS being non-zero power CSI-RSs, and with the CSI configuration information including information on RI restriction which is associated with allowable Ms to be reported.

In accordance with an another aspect of the present disclosure, a method is provided for receiving channel state information (CSI) performed by a base station in a communication system, the method including transmitting, to a terminal, CSI configuration information including configurations on a first channel state information reference signal (CSI-RS), a second CSI-RS, and a CSI-interference measurement (CSI-IM) and configuration for a CSI feedback associated with the first CSI-RS, the second CSI-RS, and the CSI-IM; transmitting, to the terminal, the first CSI-RS and the second CSI-RS; and receiving the CSI including at least one of a rank indicator (RI), a precoding matrix indicator (PMI), or a channel quality indicator (CQI), with the CSI being generated based on the configuration for CSI the feedback, and the first CSI-RS, the second CSI-RS, and the CSI-IM, and with the CSI configuration information including information RI restriction which is associated with allowable RIs to be reported.

In accordance with a further aspect of the present disclosure, a terminal is provided that for reporting channel state information (CSI) performed in a communication system, the terminal including a transceiver and a controller connected with the transceiver and configured to receive, from a base station via the transceiver, CSI configuration information including configurations on a first channel state information reference signal (CSI-RS), a second CSI-RS, and a CSI-interference measurement (CSI-IM) and configuration for a CSI feedback associated with the first CSI-RS, the second CSI-RS, and the CSI-IM; receive, from the base station, the first CSI-RS and the second CSI-RS based on the configurations on the first CSI-RS and the second CSI-RS; generate the CSI based on the configuration for the CSI feedback, and the first CSI-RS, the second CSI-RS, and the CSI-IM; and report, to the base station, the CSI including at least one of a rank indicator (RI), a precoding matrix indicator (PMI), or a channel quality indicator (CQI), with the first CSI-RS and the second CSI-RS being non-zero power CSI-RSs, and with the CSI configuration information including information on RI restriction which is associated with allowable RIs to be reported.

In accordance with yet another aspect of the present disclosure, a base station is provided for receiving channel state information (CSI) in a communication system, the base station including a transceiver and a controller connected with the transceiver and configured to transmit, to a terminal via the transceiver, CSI configuration information including configurations on a first channel state information reference signal (CSI-RS), a second CSI-RS, and a CSI-interference measurement (CSI-IM) and configuration for a CSI feedback associated with the first CSI-RS, the second CSI-RS, and the CSI-IM; transmit, to the terminal, the first CSI-RS and the second CSI-RS; and receive, from the terminal, the CSI including at least one of a rank indicator (RI), a precoding matrix indicator (PMI), or a channel quality indicator (CQI), with the CSI being generated based on the configuration for the CSI feedback, and both the first CSI-RS, the second CSI-RS, and the CSI-IM, and with the CSI configuration information including information RI restriction which is associated with allowable RIs to be reported.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION OF EMBODIMENTS OF THE PRESENT DISCLOSURE

Figure 1:
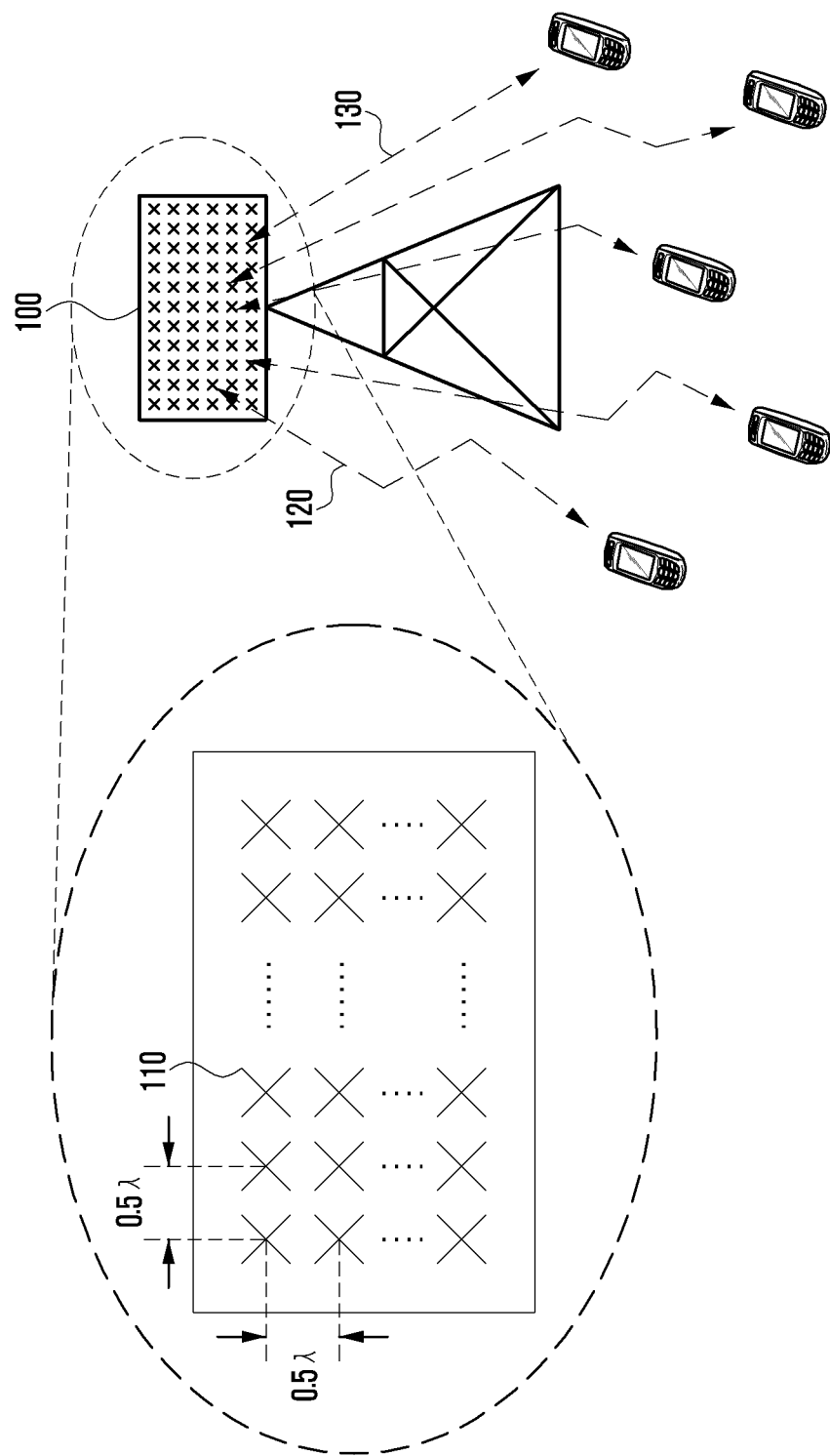
FIG. 1 is a diagram illustrating a Full Dimension MIMO (FD-MIMO) system.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The following terms are defined in consideration of the functionality in embodiments of the present disclosure, and may vary according to the intention of a user or an operator, usage, etc. Therefore, the definition should be made on the basis of the overall content of the present specification.

Although the description is directed to an OFDM-based radio communication system, particularly, the 3GPP Evolved Universal Terrestrial Radio Access (E-UTRA), it will be understood by those skilled in the art that embodiments of the present disclosure can be applied to other communication systems having a similar technical background and channel format, with a slight modification, without departing from the spirit and scope of the present disclosure.

Embodiments of the present disclosure relate to a wireless mobile communication system and, in particular, to a method for efficiently transmitting/receiving channel state information in a wireless mobile communication system operating with a multicarrier multiple access scheme such as, for example, Orthogonal Frequency Division Multiple Access (OFDMA).

Mobile communication systems have evolved into high-speed, high-quality wireless packet data communication systems that provide data and multimedia services beyond the early voice-oriented services. Recently, various mobile communication standards, such as, for example, High Speed Downlink Packet Access (HSDPA), High Speed Uplink Packet Access (HSUPA), LTE, and LTE-A defined in 3$^{rd}$ Generation Partnership Project (3GPP), High Rate Packet Data (HRPD) defined in 3rd Generation Partnership Project-2 (3GPP2), and 802.16 defined in IEEE, have been developed to support the high-speed, high-quality wireless packet data communication services.

Existing 3$^{rd}$ generation mobile communications, including LTE, Ultra Mobile Broadband (UMB), and 802.16m, operate based on a multi-carrier multiple access scheme and adopt Multiple Input Multiple Output (MIMO) with channel sensitive scheduling, such as beamforming and Adaptive Modulation and Coding (AMC), to improve transmission efficiency. These techniques increase the system throughput by improving transmission efficiency in such a way as to concentrate transmit power of a plurality of antennas, adjusting an amount of transmit data, and selectively transmitting data to the user with a best channel quality. Since most of these techniques operate based on the channel state information between the base station (eNB) and the terminal (UE or Mobile Station (MS)), the eNB or UE has to measure the channel state between the eNB and the UE. At this time, the signal used for channel state measurement is a Channel State Indication Reference Signal (CSI-RS). The eNB is a transmitter in downlink and a receiver in uplink. The one eNB may manage a plurality of cells for transmission/reception. A mobile communication system includes a plurality of eNBs distributed geographically, and each eNB performs transmission/reception through a plurality of cells.

Existing $3^{rd}$ and $4^{th}$ Generation mobile communication systems represented by LTE/LTE-A adopt a MIMO scheme with a plurality of transmit and receive antennas to transmit a plurality of information streams as spatially separated. This technique of transmitting the plurality of information streams as spatially separated is referred to as spatial multiplexing. Typically, the number of information streams capable of being spatially multiplexed depends on the number of antennas of the transmitter and the receiver. The number of information streams that can be spatially multiplexed is referred to rank in general. In the case of the MIMO scheme till the standard of LTE/LTE-A Release 11, the spatial multiplexing of up to 8×8 antennas and up to rank 8 are supported.

The FD-MIMO system, to which a technique proposed in an embodiment of the present disclosure is applied, has been evolved from the LTE/LTE-A MIMO system supporting up to 8 transmit antennas so as to support 32 or more transmit antennas. However, the scope of the present disclosure is not limited thereto.

FIG. 1 is a diagram illustrating an FD-MIMO system. The FD-MIMO system is a wireless communication system that is capable of transmitting data using a few dozen or more transmit antennas.

Referring to FIG. 1, a base station transmitter 100 transmits radio signals 120 and 130 through a few dozen or more transmit antennas. Transmit antennas 110 are arranged at a minimum distance among each other. The minimum distance may be half of the wavelength (λ/2) of the radio signal. Typically, when the transmit antennas are arranged at the distance of half of the wavelength of the radio signal, the signals transmitted by the respective transmit antennas are influenced by the radio channel with low correlation. Assuming a radio signal band of 2 GHz, this distance is 7.5 cm, and is shortened as the band becomes higher than 2 GHz.

In FIG. 1, a few dozen or more transmit antennas 110 arranged at the base station are used to transmit signals to one or more terminals as denoted by reference numerals 120 and 130. In order to transmit signals to a plurality of terminals simultaneously, an appropriated precoding is applied. One terminal may receive a plurality of information streams. Typically, a number of information streams that a terminal can receive is determined depending on the number of receive antennas of the terminal, channel state, and reception capability of the terminal.

In order to efficiently implement the FD-MIMO system, the terminal has to accurately measure the channel condition and interference size and efficiently transmit the channel state information to the base station. If the channel state information is received, the base station determines the terminals for downlink transmission, downlink data rate, and precoding to be applied. In the case of an FD-MIMO system using a large number of transmit antennas, if the channel state information transmission method of the legacy LTE/LTE-A system is applied without modification, the amount of control information to be transmitted in uplink significantly increases, resulting in uplink overhead.

The mobile communication system is restricted in resources such as, for example, time, frequency, and transmission power. Accordingly, if a resource allocated for a reference signal increases, the resource amount to be allocated for data traffic channel transmission decreases, resulting in a reduction in the amount of data transmission. Although the channel estimation and measurement performance are improved, the data transmission amount decreases, resulting in reduction of entire system throughput. Thus, there is a need for efficiently allocating resources for reference signal and traffic channel transmissions in order to maximize the entire system throughput.

Figure 2:
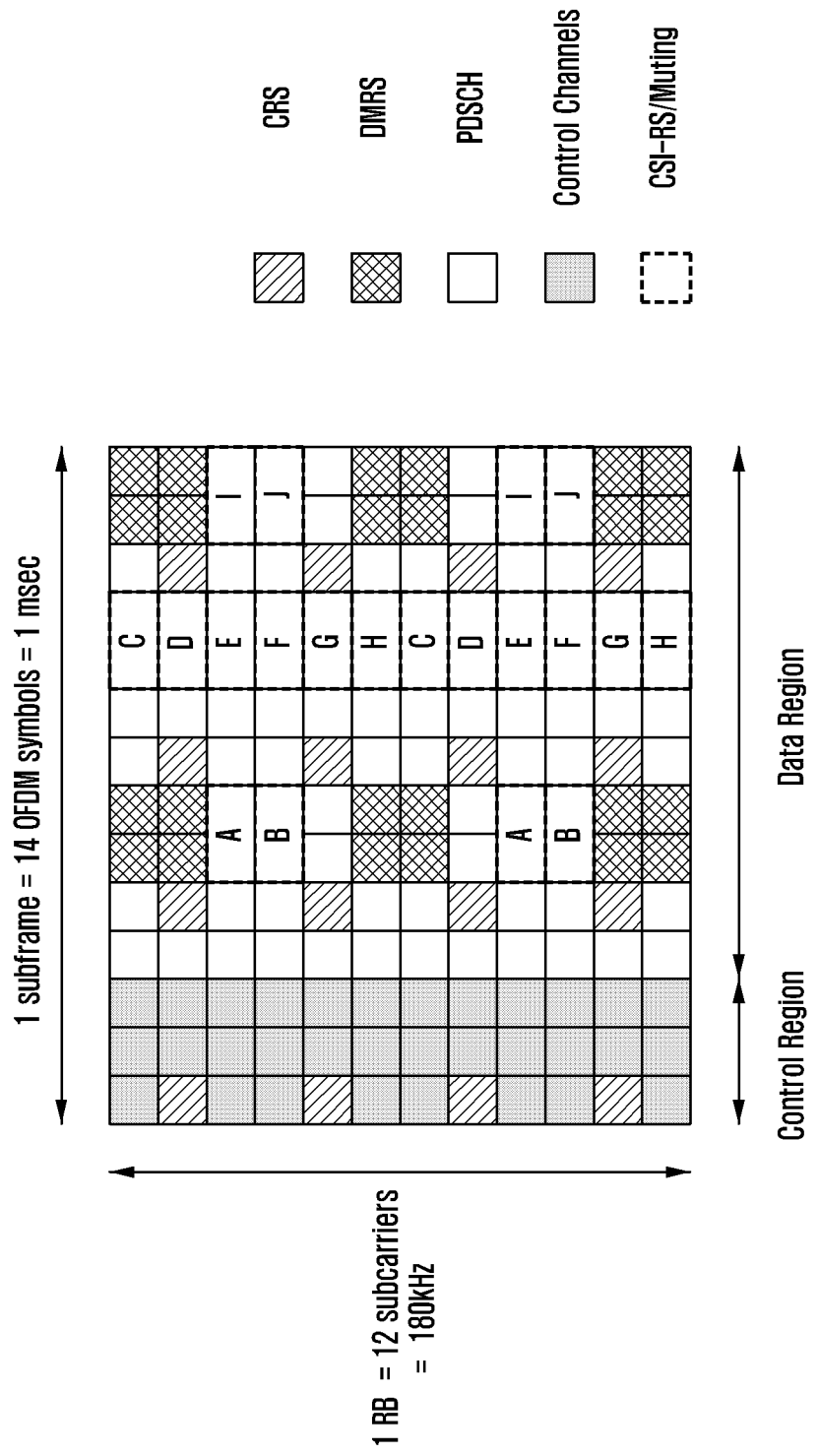
FIG. 2 is a time-frequency grid illustrating a single Resource Block (RB) of a downlink subframe as a smallest scheduling unit in the LTE/LTE-A system.

FIG. 2 is a time-frequency grid illustrating a single RB of a downlink subframe as a smallest scheduling unit in the LTE/LTE-A system.

As shown in FIG. 2, the radio resource is of one subframe in the time domain and one RB in the frequency domain. The radio resource consists of 12 subcarriers in the frequency domain and 14 OFDM symbols in the time domain, i.e., 168 unique frequency-time positions. In LTE/LTE-A, each frequency-time position is referred to as a Resource Element (RE).

The radio resource structured as shown in FIG. 2 can be used for transmitting different types of signals as follows.

1. Cell-specific Reference Signal (CRS): reference signal transmitted to all the UEs within a cell
2. Demodulation Reference Signal (DMRS): reference signal transmitted to a specific UE
3. Physical Downlink Shared Channel (PDSCH): data channel transmitted in downlink, which the eNB uses to transmit data to the UE, and mapped to REs not used for reference signal transmission in a data region of FIG. 2
4. Channel State Information Reference Signal (CSI-RS): reference signal transmitted to the UEs within a cell and used for channel state measurement. Multiple CSI-RSs can be transmitted within a cell
5. Physical Hybrid-ARQ Indicator Channel (PHICH), Physical Control Format Indicator Channel (PCFICH), Physical Downlink Control Channel (PDCCH): channels for providing a control channel necessary for the UE to receive PDCCH and transmitting ACK/NACK of HARQ operation for uplink data transmission In addition to the above signals, zero power CSI-RS can be configured in order for the UEs within the corresponding cells to receive the CSI-RSs transmitted by different eNBs in the LTE-A system. The zero power CSI-RS (muting) can be mapped to the positions designated for CSI-RS, and the UE receives the traffic signal skipping the corresponding radio resource in general. In the LTE-A system, the zero power CSI-RS is referred to as muting. The zero power CSI-RS (muting) by nature is mapped to the CSI-RS position without transmission power allocation.

In FIG. 2, the CSI-RS can be transmitted at some of the positions marked by A, B, C, D, E, F, G, H, I, and J, according to the number of number of antennas transmitting CSI-RS. Also, the zero power CSI-RS (muting) can be mapped to some of the positions A, B, C, D, E, F, G, H, I, and J. The CSI-RS can be mapped to 2, 4, or 8 REs, according to the number of antenna ports for transmission. For two antenna ports, half of a specific pattern is used for CSI-RS transmission. For four antenna ports, an entire specific pattern is used for CSI-RS transmission. For eight antenna ports, two patterns are used for CSI-RS transmission. Muting is always performed by pattern. Specifically, although muting may be applied to a plurality of patterns, if the muting positions mismatch CSI-RS positions, it cannot be partially applied to one pattern.

When transmitting CSI-RSs of two antenna ports, the CSI-RSs are mapped to two consecutive REs in the time domain and distinguished from each other using orthogonal codes. When transmitting CSI-RSs of four antenna ports, the CSI-RSs are mapped in the same way of mapping the two more CSI-RSs to two more consecutive REs. This is applied to the case of transmitting CSI-RSs of eight antenna ports.

In a cellular system, the reference signal has to be transmitted for downlink channel state measurement. In the case of the 3GPP LTE-A system, the UE measures the channel state with the eNB using the CSI-RS transmitted by the eNB. The channel state is measured in consideration of a few factors including downlink interference. The downlink interference includes the interference caused by the antennas of neighbor eNBs and thermal noise that are important in determining the downlink channel condition. For example, when an eNB with one transmit antenna transmits a reference signal to a UE with one receive antenna, the UE has to determine an energy per symbol that can be received in downlink and an interference amount that may be received for the duration of receiving the corresponding symbol to calculate Es/Io from the received reference signal. The calculated Es/Io is reported to the eNB such that the eNB determines the downlink data rate for the UE.

In the LTE-A system, the UE feeds back the information on the downlink channel state for use in downlink scheduling of the eNB. Specifically, the UE measures the reference signal transmitted by the eNB in downlink and feeds back the information estimated from the reference signal to the eNB in the format defined in LTE/LTE-A standard. In LTE/LTE-A, the UE feedback information includes the following three indicators:

1. RI: number of spatial layers that can be supported by the current channel experienced at the UE
2. PMI: precoding matrix recommended by the current channel experienced at the UE
3. CQI: maximum possible data rate that the UE can receive signals in the current channel state. CQI may be replaced with the SINR, a maximum error correction code rate and modulation scheme, or per-frequency data efficiency that can be used in a similar way to the maximum data rate.

The RI, PMI, and CQI have associated meanings. For example, the precoding matrix supported in LTE/LTE-A is configured differently per rank. Accordingly, the PMI value 'X' is interpreted differently for the cases of RI set to 1 and RI set to 2. Also, when determining CQI, the UE assumes that the PMI and RI, which it has reported, are applied by the eNB. Specifically, if the UE reports RI_X, PMI_Y, and CQI_Z; this means that the UE is capable of receiving the signal at the data rate corresponding to CQI_Z when the rank RI_X and the precoding matrix PMI_Y are applied. In this way, the UE calculates CQI with which the optimal performance is achieved in real transmission under the assumption of the transmission mode to be selected by the eNB.

In LTE/LTE-A, a CSI process is defined as a means for configuring feedback of channel state information such as the CQI, RI, and PMI to the terminal. The CSI process consists of one CSI-RS for measuring a channel and one interference measurement resource (IMR). The base station can set up more than one CSI process per terminal, and the terminal measures the reception strength of the received signal that has passed through the channel by measuring the CSI-RS specified in the CSI process, and measures the intensity of the interference affecting the signal by measurement on the IMR. The IMR is a radio resource that is separately configured by the base station for interference measurement of the terminal, and the terminal assumes that all signals received from the radio resource are interference. In addition, one interference measurement resource consists of radio resources corresponding to one of A, . . . , H of FIG. 2 to which the muting (zero power CSI-RS) can be applied. As an example, when the base station configures the radio resource corresponding to B in FIG. 2 as the interference measurement resource, the UE performs interference measurement on the radio resource corresponding to B every RB.

Typically, in FD-MIMO using a plurality of transmit antennas, the number of CSI-RSs has to increase in proportion to the number of transmit antennas. For an LTE/LTE-A using 8 transmit antennas, the eNB has to transmit CSI-RSs of 8 ports to the UE for downlink channel state measurement. In order to transmit 8-port CSI-RSs, 8 REs must be allocated for CSI-RS transmission in one RB. For example, the REs indicated by A and B can be used for CSI-RS transmission of the corresponding eNB. When applying a CSI-RS transmission scheme of LTE/LTE-A to FD-MIMO, the CSI-RS transmission resource increases in proportion to the number of transmit antennas. Specifically, the eNB having 128 transmit antennas has to transmit CSI-RS on 128 REs in one RB. Such a CSI-RS transmission scheme consumes excessive radio resources, and thus, causes a shortage of resources for data transmission.

For the eNB having a plurality of transmit antennas, an FD-MIMO may transmit CSI-RSs on N dimensions such that the UE performs channel measurements for a plurality of transmit antennas without excessive resource allocation for CSI-RS transmission. As shown in FIG. 1 where the transmit antennas 110 of the eNB are arranged 2-dimensionally, the CSI-RSs may be transmitted as separated into 2 dimensions. One CSI-RS is used as a horizontal CSI-RS for acquiring the horizontal direction channel information, while the other CSI-RS is used as a vertical CSI-RS for acquiring vertical direction channel information.

Figure 3:
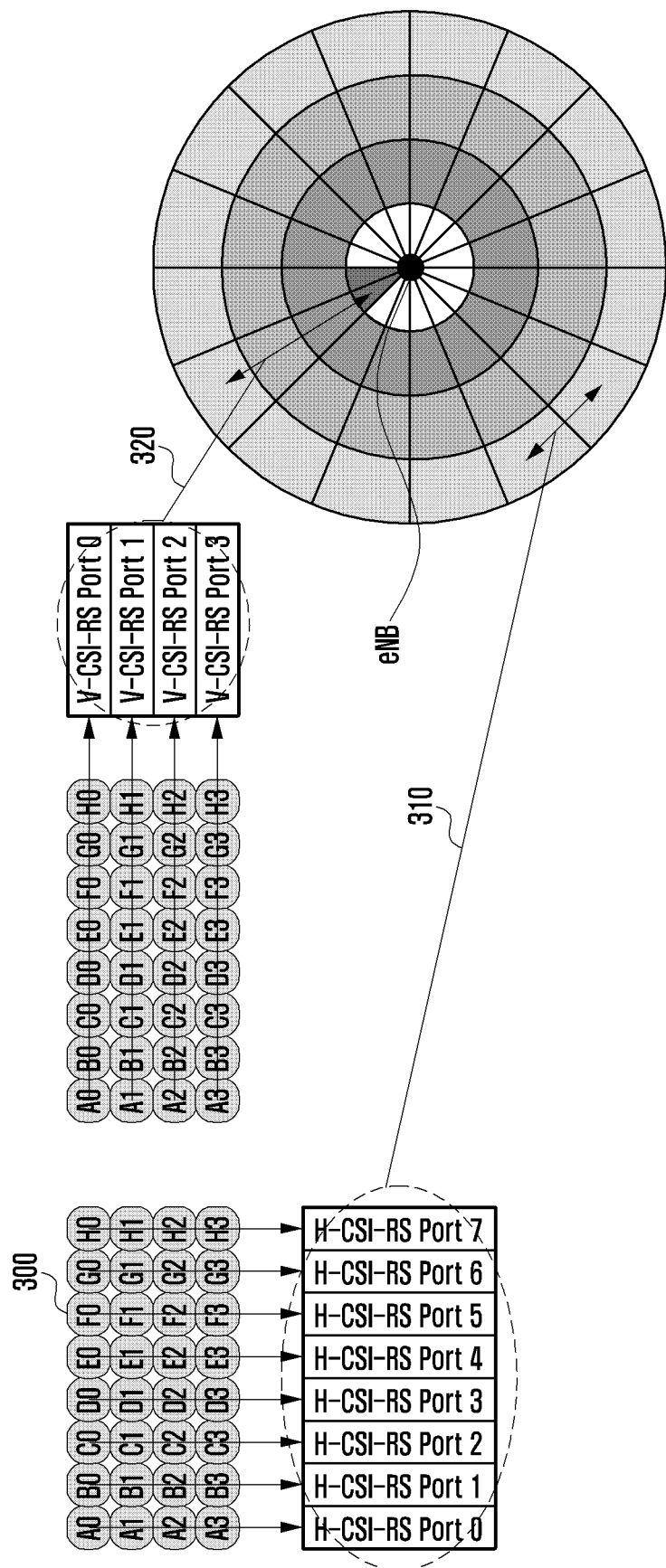
FIG. 3 is a diagram illustrating a mechanism for CSI-RS transmission in FD-MIMO system, according to an embodiment of the present disclosure.

FIG. 3 is a diagram illustrating a mechanism of CSI-RS transmission in FD-MIMO system, according to an embodiment of the present disclosure.

Referring to FIG. 3, the eNB operating in FD-MIMO mode has total 32 antennas. The number of antennas may vary depending on the embodiment. In FIG. 3, 32 antennas 300 are indicated by A0, . . . , A3, B0, . . . , B3, C0, . . . , C3, D0, . . . , D3, E0, . . . , E3, F0, . . . , F3, G0, . . . , G3, and H0, . . . , H3. Two CSI-RSs are transmitted through the 32 antennas. The antenna ports corresponding to H-CSI-RS for use in measuring horizontal channel state consist of the following 8 antenna ports:

1. H-CSI-RS port 0: group of antennas A0, A1, A2, and A3
2. H-CSI-RS port 1: group of antennas B0, B1, B2, and B3
3. H-CSI-RS port 2: group of antennas C0, C1, C2, and C3
4. H-CSI-RS port 3: group of antennas D0, D1, D2, and D3

5. H-CSI-RS port 4: group of antennas E0, E1, E2, and E3
6. H-CSI-RS port 5: group of antennas F0, F1, F2, and F3
7. H-CSI-RS port 6: group of antennas G0, G1, G2, and G3
8. H-CSI-RS port 7: group of antennas H0, H1, H2, and H3

The grouping a plurality of antennas into one CSI-RS port is a concept referred to as antenna virtualization. Typically, antenna virtualization is performed through linear combination of a plurality of antennas. The antenna ports corresponding to V-CSI-RS for use in measuring vertical channel state consist of the following 4 antenna ports:

1. V-CSI-RS port 0: group of antennas A0, B0, C0, D0, E0, F0, G0, and H0
2. V-CSI-RS port 1: group of antennas A1, B1, C1, D1, E1, F1, G1, and H1
3. V-CSI-RS port 2: group of antennas A2, B2, C2, D2, E2, F2, G2, and H2
4. V-CSI-RS port 3: group of antennas A3, B3, C3, D3, E3, F3, G3, and H3

It is assumed that a plurality of antennas are arranged 2-dimensionally as described above. The antennas are arranged orthogonally forming M rows in the vertical direction and N columns in the horizontal direction. The UE is capable of measuring FD-MIMO channels using N H-CSI-RS ports and M V-CSI-RS ports. As aforementioned, if two CSI-RSs are used, the channel state information can be acquired using M+N CSI-RS ports for M×N transmit antennas. Since the channel information on a large number of transmit antennas is acquired using a relatively small number of CSI-RS ports, it is advantageous in reducing the CSI-RS overhead. Although embodiments of the present disclosure are directed to channel information on the FD-MIMO transmit antennas using two CSI-RSs, this approach can be applied to the cases of using two or more CSI-RSs.

In FIG. 3, the RSs of the 32 transmit antennas are mapped to 8 H-CSI-RS ports and 4 V-CSI-RS ports, and the UE measures the radio channels using the CSI-RSs of the FD-MIMO system. The H-CSI-RS can be used for estimating the horizontal angle between the UE and the eNB transmit antennas as denoted by reference numeral 310, while the V-CSI-RS can be used for estimating the vertical angle between the UE and the eNB transmit antennas as denoted by reference numeral 320.

The following abbreviations are used throughout the specification:

$RI_H$: RI generated based on H-CSI-RS for feedback to the eNB
$RI_V$: RI generated based on V-CSI-RS for feedback to the eNB
$RI_{HV}$: RI generated based on H-CSI-RS and V-CSI-RS for feedback to the eNB
$PMI_H$: PMI generated based on H-CSI-RS for feedback to the eNB
$PMI_V$: PMI generated based on V-CSI-RS for feedback to the eNB
$CQI_H$: UE-recommended data rate generated under the assumption that only the horizontal direction precoding matrix is applied
$CQI_V$: UE-recommended data rate generated under the assumption that only the vertical precoding matrix is applied
$CQI_{HV}$: UE-recommended data rage generated under the assumption that both the horizontal and vertical precoding matrices are applied The following description is directed to the case of using the horizontal direction channel state information and the vertical direction channel state information. When an eNB operates with two or more CSI-RSs, however, other types of channel state information can also be applied to the horizontal and vertical direction channel state information. In an embodiment of the present disclosure where the CSI-RS mapped to an antenna port from the first view point (first CSI-RS) and the CSI-RS mapped to an antenna port from the second view point (second CSI-RS) are used, the UE is capable of acquiring the channel state information (first and second channel state information) based on the two respective CSI-RSs and the channel state information (third channel state information) based on both the CSI-RSs. The configuration described in the following description is applicable to various embodiments in similar manner. The following description is directed to an embodiment of the present disclosure using V-CSI-RS and H-CSI-RS.

In the following description, the channel state information corresponding to the vertical direction CSI-RS is referred to as vertical direction channel state information. The vertical direction channel state information includes at least one of RI, PMI, and CQI acquired based on the vertical direction CSI-RS.

In the following description, the channel state information corresponding to the horizontal direction CSI-RS is referred to as horizontal direction channel state information. The horizontal channel state information includes at least one of RI, PMI, and CQI acquired based on the horizontal direction CSI-RS.

When the eNB sends the UE two or more CSI-RSs, the UE is capable of transmitting the channel state information corresponding to the respective CSI-RSs. Each of the channel state information includes at least one of RI, PMI, and CQI. However, the UE may acquire the channel state information based on the two or more CSI-RSs in an embodiment of the present disclosure. Acquisition of the channel state information is described in greater detail below.

Figure 4:
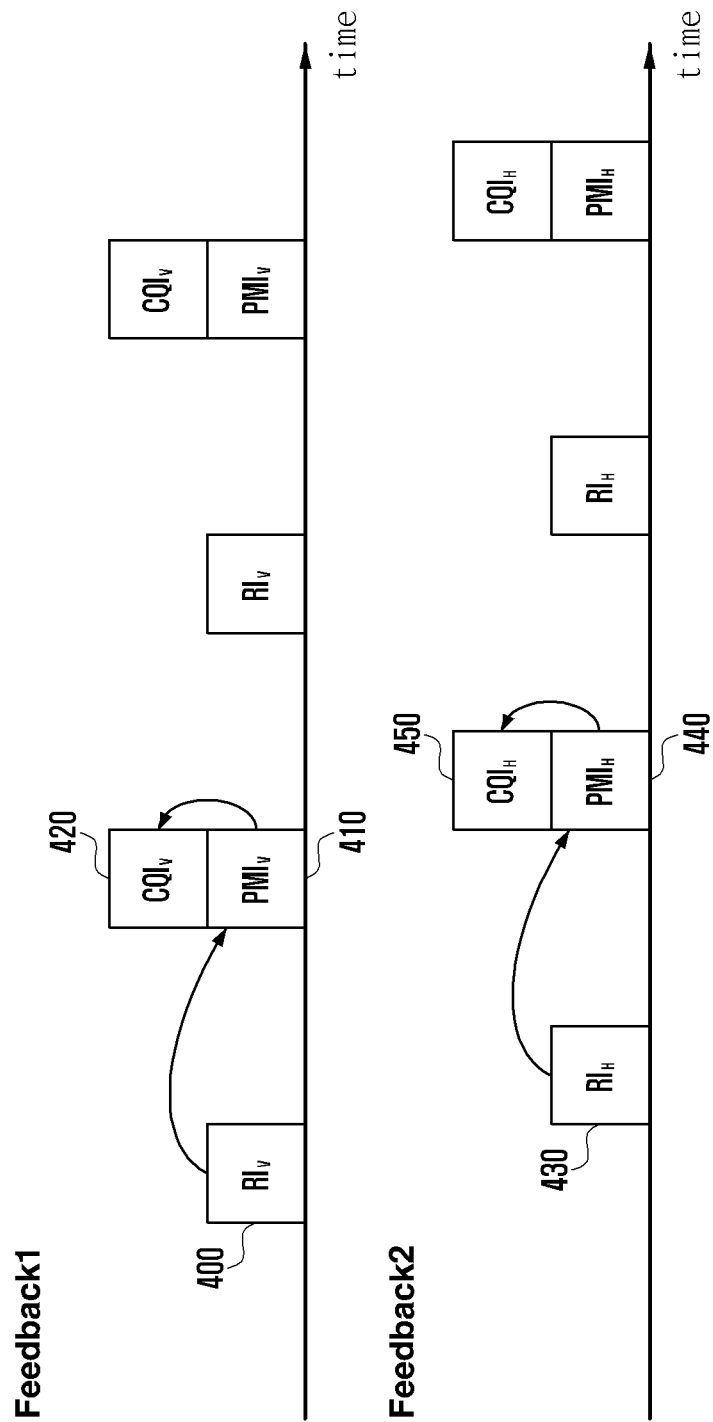
FIG. 4 is a diagram illustrating a mechanism for transmitting Rank Indicator (RI), Precoding Matrix Indicator (PMI), and Channel Quality Indicator (CQI) based on two CSI-RS in the feedback method, according to an embodiment of the present disclosure.

FIG. 4 is a diagram illustrating a mechanism of transmitting RI, PMI, and CQI based on two CSI-RS in the feedback method, according to an embodiment of the present disclosure. The UE reports the radio channel state information of the FD-MIMO to the eNB by transmitting RI, PMI, and CQI for the respective CSI-RSs.

In FIG. 4, the arrow indicates how a certain type of channel state information is related to other types of channel state information. The arrow starting from $RI_V$ 400 and ending at $PMI_V$ 410 indicates that the $PMI_V$ 410 is interpreted differently according to the value of $RI_V$ 400. Specifically, the arrow means that the UE uses the value of the $RI_V$ 400 to interpret $CQI_V$ 420. Likewise, the UE uses the value of $RI_H$ 430 to interpret $PMI_H$ 440.

In FIG. 4, the UE measures the V-CSI-RS and transmits the channel state information in the method indicated by "Feedback 1". The UE also measures the H-CSI-RS and transmits the channel state information in the method indicated by "Feedback 2". Here, RI, PMI, and CQI are transmitted in the state of being correlated among each other. In the case of "Feedback 1", the $RI_V$ 400 notifies of the rank of the precoding matrix indicated by the $PMI_V$ 410. Also, the $CQI_V$ 420 indicates the data rate at which the UE can receive data or a corresponding value in the case of applying the precoding matrix of the corresponding rank which is indicated by the $PMI_V$ 410, when the transmission is performed at the rank indicated by the $RI_V$ 400. In the case of "Feedback 2", the RI 430, the PMI 440, and CQI 450 are transmitted in the state of being correlated among each other like the case of "Feedback 1".

As shown in FIG. 4, one of the channel state information report methods may configure a plurality of feedback for a plurality of transmit antennas of the FD-MIMO eNB, and make the UE report channel state information to the eNB. This method is advantageous in that the UE is capable of generating and reporting channel state information for FD-MIMO without extra implementation.

However, in the channel state information report method of FIG. 4, it is difficult to achieve enough throughput of the FD-MIMO system. This is due to the fact that although the UE configures a plurality of feedback to report the channel state information to the eNB, the CQI is generated without an assumption on the precoding when the FD-MIMO is applied.

When a plurality of transmit antennas 110 of the FD-MIMO system are arranged 2-dimentinally, as shown in FIG. 3, both the vertical direction precoding matrix and the horizontal direction precoding matrix are applied to the signal transmitted by the UE. Specifically, the UE receives the signal to which the precoding matrices corresponding to the $PMI_H$ 440 and the $PMI_V$ 410 other than the signal to which one of the $PMI_H$ 440 and the $PMI_V$ 410.

If only the $CQI_H$ 450 and the $CQI_V$ 420 corresponding to precodings indicated by the respective $PMI_H$ 440 and $PMI_V$ 410 are reported to the eNB, the eNB has to determine the CQI to which both the vertical and horizontal direction precoding matrices are applied, without receipt of such a CQI. If the eNB determines the CQI to which both the vertical and horizontal direction precoding matrices are applied arbitrarily, this may cause degradation of system performance.

As described above, one of the methods for mitigating the use of radio resource for CSI-RS transmission in the FD-MIMO system is to make the UE measure a plurality CSI-RSs capable of efficiently estimating a plurality of transmit antennas. Each CSI-RS can be used for the UE to measure the channel state of one of a plurality dimensions for measuring one radio channel. This method requires a relatively small amount of radio resources for CSI-RS transmission as compared to the method of allocating a unique CSI-RS ports for the respective transmit antennas. For example, when using two CSI-RSs in the vertical and horizontal direction for the transmit antennas of the FD-MIMO that are arranged in the form of a rectangle, the UE is capable of efficiently measuring the channel state. Embodiments of the present disclosure propose a novel technology and apparatus that is capable of allowing the UE to measure a plurality of CSI-RSs and efficiently report the channel state information in the FD-MIMO system including a plurality of transmit antennas.

Figure 5:
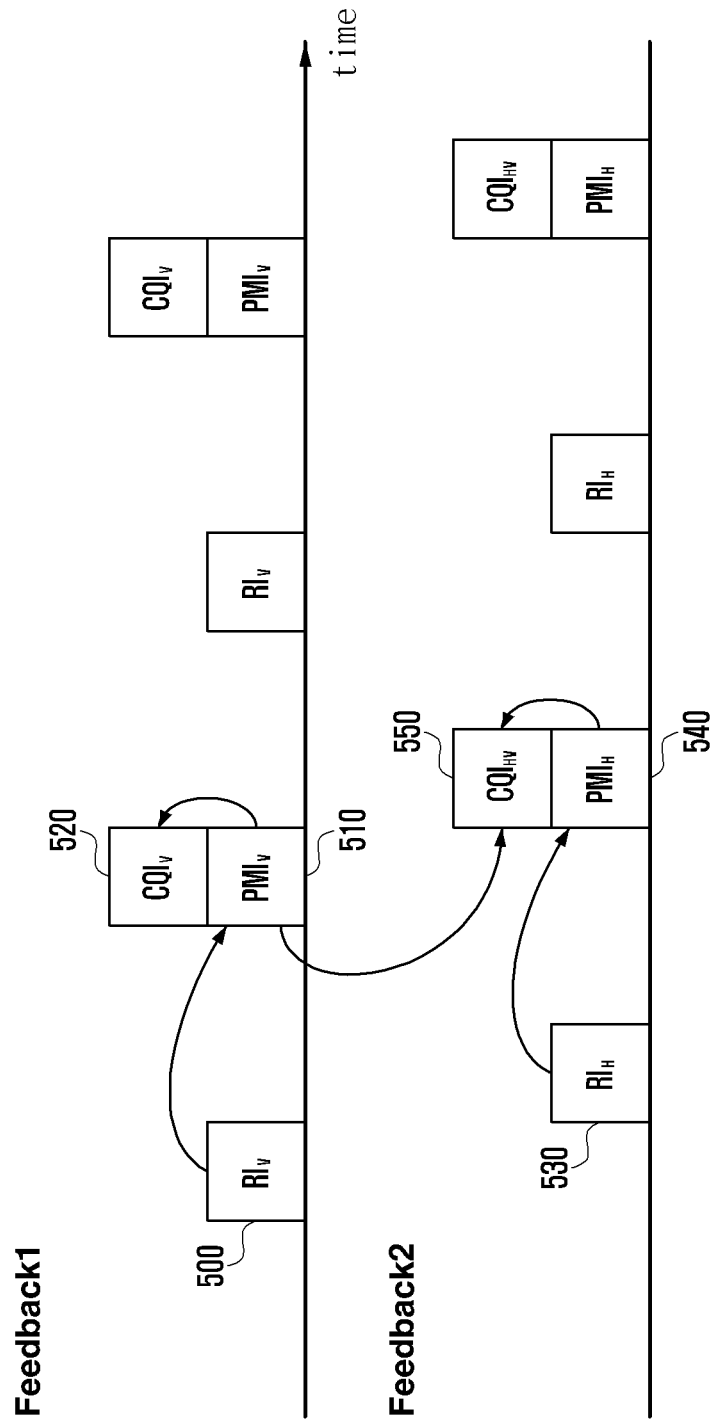
FIG. 5 is a diagram illustrating a mechanism for transmitting channel state information, according to an embodiment of the present disclosure.

FIG. 5 is a diagram illustrating a mechanism of transmitting channel state information, according to an embodiment of the present disclosure.

In FIG. 5, the channel state information corresponding to the two CSI-RSs are reported as in the embodiment of FIG. 4. The channel state information transmission method is indicated by "Feedback 1" as in the embodiment of FIG. 4. Specifically, the UE measures V-CSI-RS to report $RI_V$ 500, $PMI_V$ 510, and $CQI_V$ 520 to the eNB. The embodiment of FIG. 5 differs from the embodiment of FIG. 4 in the procedure of indication with "Feedback 2". The UE reports the CQI for the case where the precoding is applied in both the vertical and horizontal directions, i.e., $CQI_{HV}$ 550, to the eNB. Specifically, the UE reports to the eNB the most recent $PMI_V$ 510 generated in the procedure indicated with "Feedback 1" and $CQI_{HV}$ 550 generated in the case where the precodings indicated by PMI 540, which is determined optimal based on the H-CSI-RS measurement.

In the embodiment of FIG. 5, the UE measures the V-CSI-RS to generate the $RI_V$ 500, which is reported to the eNB. The UE determines the $PMI_V$ 510 optimal to the corresponding rank 500 and reports the $CQI_V$ 520 when the precoding indicated by the $PMI_V$ 510 is applied. The UE measures H-CSI-RS to generate RI 530, which is reported to the eNB. The UE reports to the eNB the $CQI_{HV}$ 550 generated by applying the precoding indicated by PMI 540 optimal to the corresponding rank 530 and the precoding indicated by the previously transmitted $PMI_V$ 510.

As shown in FIG. 5, in order for the UE to report the CQI value for the case where the precoding matrix indicated by the $PMI_H$ 540 and the precoding matrix indicated by the $PMI_V$ 510 are allocated simultaneously to the eNB, the following may be required.

First, it is required to define a function for determining whether to take two PMIs into consideration to determine at least one of two CQIs. Specifically, the eNB notifies the UE of the correlation of the feedback information in configuring a plurality of feedbacks to the UE, and the UE generates CQI based thereon. In the case of FIG. 5, a control message instructing to calculate the second CQI, i.e., the $CQI_{HV}$ 550, by applying the first PMI, i.e. the $PMI_V$ 510, and the second PMI, i.e. the $PMI_H$ 540, together has to be transmitted from the eNB to the UE.

Second, it is required to define how to determine CQI in the case of applying a plurality of precodings. When calculating a CQI when only one precoding is applied, the UE calculates CQI under the assumption that the precoding indicated by RI and PMI it has reported is applied in downlink. However, in the case of the $CQI_{HV}$ 550, the UE calculates CQI under the assumption that two precodings are simultaneously applied in downlink. The UE may interpret the application of two precodings as the Kronecker product. The Kronecker product is defined with two matrices as shown in Equation (1) below.

$$A \otimes B = \begin{bmatrix} a_{11}B & \cdots & a_{1n}B \\ \vdots & \ddots & \vdots \\ a_{m1}B & \cdots & a_{mn}B \end{bmatrix} \qquad (1)$$

In Equation (1), A and B denote matrices, and $a_{11}$ to $a_{mn}$ denote elements of matrix A, and $a_{ij}$ denotes the element at $i_{th}$ row and $j_{th}$ column.

In Equation (1), the UE is capable of acquiring the precoding matrix for the case where two precoding matrices are applied simultaneously by replacing A and B with the precoding matrices indicated by the $PMI_H$ 540 and the $PMI_V$ 510. When calculating the $CQI_{HV}$ 550, the UE calculates the $CQI_{HV}$ 550 under the assumption that the precoding matrix acquired by applying the Equation (1) to the precoding matrices indicated by the $PMI_H$ 540 and $PMI_V$ 510 is applied in downlink.

In order to acquire the precoding matrix for the case where the two precoding matrices are applied using the Kronecker product of Equation (1), it is necessary for the UE and eNB to operate differently depending on the rank reported by the UE. Three embodiments are proposed for this purpose.

Rank-Related Embodiment 1

The eNB configures one of the $RI_V$ 500 and the $RI_H$ 530 with rank 1 always. For example, if the $CQI_{HV}$ 550 is reported along with the $RI_H$ 530 to the eNB, the $RI_V$ 500 is restricted to be always set to 1. The rank supported in the case where two precoding matrices are applied simultaneously is determined depending on the $RI_H$ 530. Specifically, when the $RI_H$ 530 is set to 1, the UE is capable of supporting rank 1; and when the $RI_H$ 530 is set to 2, the UE is capable of supporting rank 2. The UE and the eNB operate in the FD-MIMO system under this assumption. Although two CSI-RSs are assumed in this embodiment of the present disclosure, if the number of CSI-RS is 3 or more, RIs have to be set to 1 with the exception of the RI corresponding to one CSI-RS.

Rank-Related Embodiment 2

When the vertical and horizontal direction precoding matrices are applied simultaneously, the eNB and the UE determine the rank supportable by the UE using Equation (2) set forth below.

$$\text{rank}_{HV} = \text{rank}(RI_H) \times \text{rank}(RI_V) \quad (2)$$

Specifically, the UE and the eNB exchange the channel state information under the assumption that the rank for the case where the vertical and horizontal direction precoding matrices are applied simultaneously is the product of the two ranks supportable in the respective directions. For example, if the UE reports the $RI_H$ set to 2 and $RI_V$ set to 3 to the eNB, the eNB and the UE assume that the rank for the case where all of the precoding matrices are applied is 6.

In LTE/LTE-A, if the UE reports to the eNB the RI corresponding to rank 2 or higher, two CQI values are reported to the eNB. This is due to the fact that the eNB transmits two codewords to the UE, and thus, the UE has to separately report the CQIs corresponding to respective codewords.

When the method of Equation (2) is applied to the embodiment of FIG. 5, if the rank for the case where the precodings obtained by Equation (2) is 2 or higher although the $RI_H$ 530 is set to 1, the UE transmits the two CQIs in the form of the $CQI_{HV}$ 550. Also, if the rank for the case where all of the precodings obtained by Equation (2) is 2 or higher, the eNB receives the two CQIs under the assumption that they are transmitted in the form of the $CQI_{HV}$ 550.

In the method of measuring, at the UE, the horizontal and vertical direction channel state information corresponding to two CSI-RS and reporting the channel state information to the eNB, as shown in FIG. 4 or 5, transmission of "Feedback 1" and "Feedback 2" may cause collision. The term 'collision' refers to a situation in which transmission of "Feedback 1" and "Feedback 2" is required at the same time. If any collision is predicted, the UE may report the channel state information of one of "Feedback 1" and "Feedback 2". The FD-MIMO operation with the configuration of a plurality of feedback, as shown in FIG. 4 or 5, may cause the channel state information to be partially missed.

Figure 6:
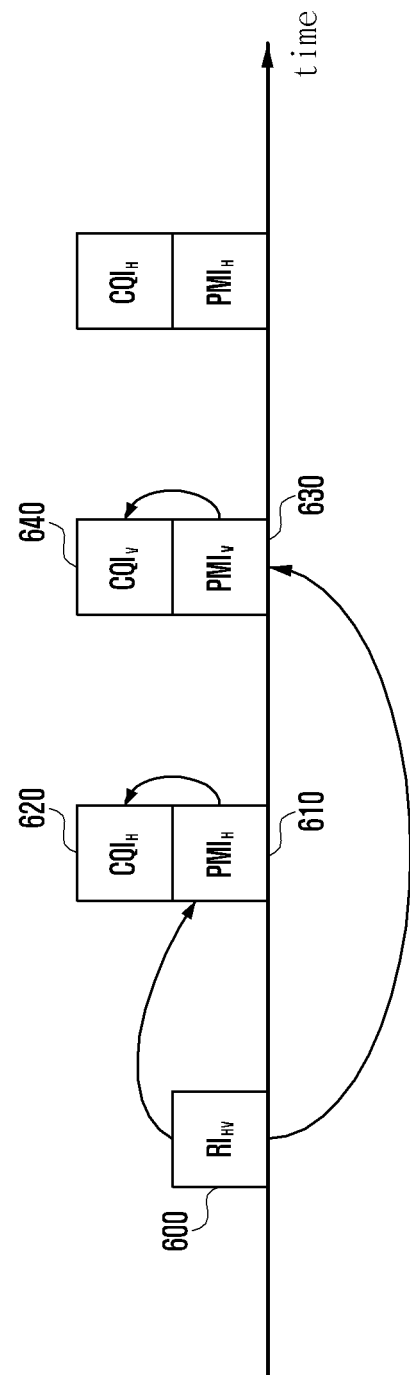
FIG. 6 is a diagram illustrating a mechanism for transmitting channel state information, according to an embodiment of the present disclosure.

FIG. 6 is a diagram illustrating a mechanism of transmitting channel state information, according to an embodiment of the present disclosure.

Although the UE reports the channel state information corresponding to two CSI-RSs, the feedback method of FIG. 6 differs from that of FIG. 4 in that the feedback is completed in only one feedback process. Referring to FIG. 6, the UE transmits $RI_{HV}$ 600 to report the horizontal and vertical direction ranks. Table 1 shows horizontal and vertical direction ranks (first second ranks).

TABLE 1

| $RI_{HV}$ | Horizontal direction rank | Vertical direction rank |
|---|---|---|
| 000 | 1 | 1 |
| 001 | 2 | 1 |
| 010 | 3 | 1 |
| 011 | 4 | 1 |
| 100 | 1 | 2 |
| 101 | 2 | 2 |
| 110 | 3 | 2 |
| 111 | 4 | 2 |

The eNB may acquire the horizontal and vertical direction ranks from the $RI_{HV}$ 600 transmitted by the UE. The UE determines the value of the $RI_{HV}$ 600 based on both the two CSI-RS, i.e., H-CSI-RS and V-CSI-RS. The eNB checks the information on the horizontal and vertical direction precodings and UE-supportable data rate based on PMIs 610 and 630 and CQIs 620 and 640 corresponding to the H-CSI-RS and V-CSI-RS. Since the horizontal and vertical direction PMIs and CQIs are transmitted alternately in one feedback process, it is possible to avoid the collisions of the feedback transmissions that may occur in the embodiments of FIGS. 4 and 5. In FIG. 6, the horizontal and vertical direction ranks may have different values depending on the value of the $RI_{HV}$ 600 reported by the UE. Specifically, the precoding matrix indicated by the $PMI_H$ 610 is determined depending on the horizontal direction PMI indicated by the value of the $RI_{HV}$ 600. The UE also transmits CQI obtained under the assumption of the case where the precoding matrix indicated by the $RI_H$ 610 is applied, i.e., the $CQI_H$ 620. In order to determine the values of the $PMI_H$ 610 and the $CQI_H$ 620, the UE measures the H-CSI-RS. Likewise, the precoding matrix indicated by the $PMI_V$ 630 is determined depending on the vertical direction rank indicated by the $RI_{HV}$ 600. The UE also transmits CQI obtained under the assumption of the case where the precoding matrix indicated by the $PMI_V$ 630 is applied, i.e., the $CQI_V$ 640. In order to determine the values of $PMI_V$ 630 and $CQI_V$ 640, the UE measures V-CSI-RS.

Referring to FIG. 6, the UE alternately transmits the horizontal channel state information 610 and 620 and the vertical channel state information 630 and 640. It is also possible to alternately transmit the horizontal and vertical channel state information in the same interval.

In a real system, however, such a method may not be appropriate. Specifically, it may advantageous for the UE to report specific direction channel state information at an interval shorter than that of the other direction channel state information in view of system throughput optimization. In order for the UE to report channel state information corresponding to a plurality of CSI-RSs to the eNB at different intervals, it is preferred for the eNB to perform configuration thereon. Specifically, in the case that the UE reports different direction channel state information to the eNB in one feedback process, the eNB may notify the UE of the following information for configuration thereon:

Feedback interval and frame offset for horizontal direction channel state information ($CQI_H$, $PMI_H$), i.e., first channel state information Feedback interval and frame offset for vertical direction channel state information ($CQI_V$ and $PMI_V$), i.e., second channel state information The subframe offset value is the value determining the subframe position for real transmission in a period. For example, if the period is 10 milliseconds (msec) and the subframe offset is 5, this means that the corresponding signal is transmitted at the subframe 5 in the period of 10 milliseconds.

Figure 7:
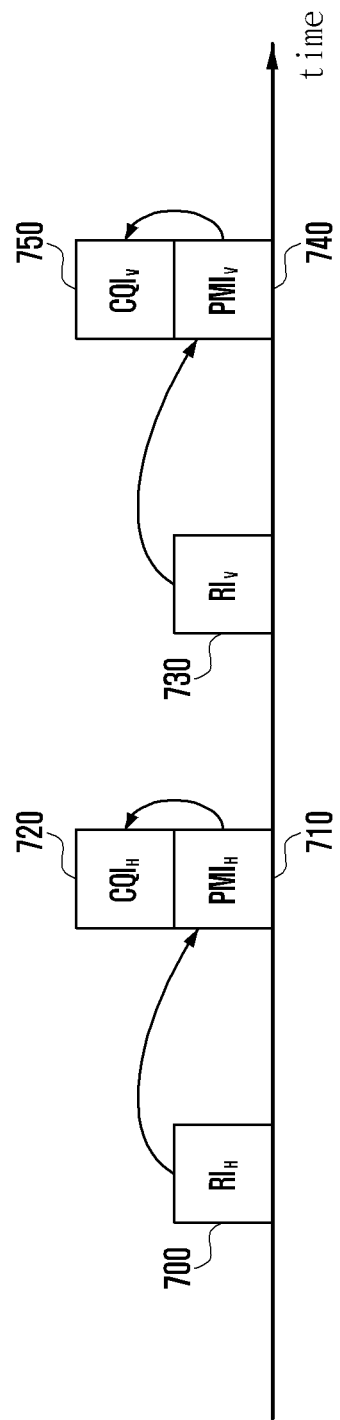
FIG. 7 is a diagram illustrating a mechanism for transmitting channel state information, according to another embodiment of the present disclosure.

In FIG. 6, the horizontal and vertical direction ranks reported from the UE to the eNB may be determined depending on different rank restrictions. The rank restriction is to restrict, when the UE measures the RS to determine the rank, the maximum value to the value preconfigured by the eNB. In the mobile communication system, if the eNB is allowed to restrict the maximum value of the rank for the UE, it can be interpreted as a part of the optimization procedure for controlling the system in the eNB-preferred way. In order to apply the rank restriction to the respective horizontal and vertical direction ranks, the eNB may notify the UE of the following information through higher layer signaling or in another method:

1. Maximum value of horizontal direction rank
2. Maximum value of vertical direction rank FIG. 7 is a diagram illustrating a mechanism of transmitting channel state information, according to another embodiment of the present disclosure. In the embodiment of FIG. 7, the UE reports the channel state information to the eNB in one feedback process as in the embodiment of FIG. 6. However, the embodiment of FIG. 7 differs from the embodiment of FIG. 6 in that the horizontal and vertical direction ranks are reported with $RI_H$ 700 and $RI_V$ 730 separately, rather than with $RI_{HV}$ 600.

Referring to FIG. 7, the $RI_H$ 700 is reported and then followed by $PMI_H$ 710 and $CQI_H$ 720 based thereon. Also, the $RI_V$ 730 is reported and then followed by $PMI_V$ 740 and $CQI_V$ 750 based thereon. Although the $RI_H$ 700 and the $RI_V$ 730 are reported separately, the intervals and ranks of the horizontal and vertical channel state information may be configured differently, as in the embodiment of FIG. 6.

Figure 8:
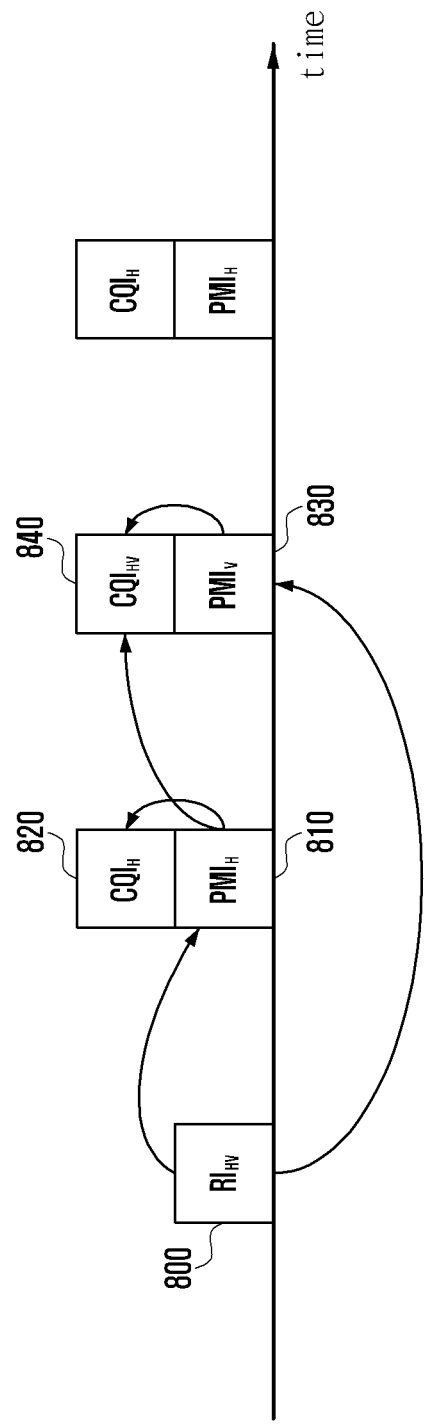
FIG. 8 is a diagram illustrating a mechanism for transmitting channel state information, according to another embodiment of the present disclosure.

FIG. 8 is a diagram illustrating a mechanism of transmitting channel state information, according to another embodiment of the present disclosure.

When the UE reports the channel state information corresponding to a plurality of CSI-RSs in a signal feedback process, as in the embodiments of FIGS. 6 and 7, the absence of the CQI for the case where the horizontal and vertical direction precodings are applied simultaneously may cause system performance degradation, as described above.

Referring to FIG. 8, the UE transmits $RI_{HV}$ 800 to the eNB. The eNB may acquire or recognize the horizontal and vertical direction ranks based on the $RI_{HV}$ 800. The UE transmits the horizontal direction channel state information including $PMI_H$ 810 and $CQI_H$ 820. The UE also transmits $PMI_V$ 830 as the horizontal channel state information, and then the CQI is acquired by taking both the horizontal and vertical direction precodings into account, i.e., $CQI_{HV}$ 840, along with the $PMI_V$ 830 simultaneously. The $CQI_{HV}$ 840 is the CQI acquired for the case where the horizontal and vertical direction precodings are applied. Accordingly, the rank is also determined as the function of the horizontal and vertical direction ranks. The UE assumes the Kronecker product of the two precoding matrices as shown in Equation (1) as the precoding applied for generating the $CQI_{HV}$ 840.

This method of transmitting the horizontal and vertical direction channel state information and the $CQI_{HV}$ 840 from the UE to the eNB in a signal feedback process, as shown in FIG. 8, makes it possible to transmit the value of the $CQI_{HV}$ 840 under the assumption of the application of horizontal and vertical direction precodings. However, this method has a shortcoming in that the $CQI_H$ 820 generated under the assumption of the application of only the horizontal direction precoding has a low degree of utilization. In FIG. 8, the reason for transmitting the $CQI_H$ 820 is because the information on the $PMI_H$ 810 and the $PMI_V$ 830 is required for transmitting CQI assuming horizontal and vertical direction precodings, but only one of the PMIs can be reported at the time of transmitting the $CQI_H$ 820.

Figure 9:
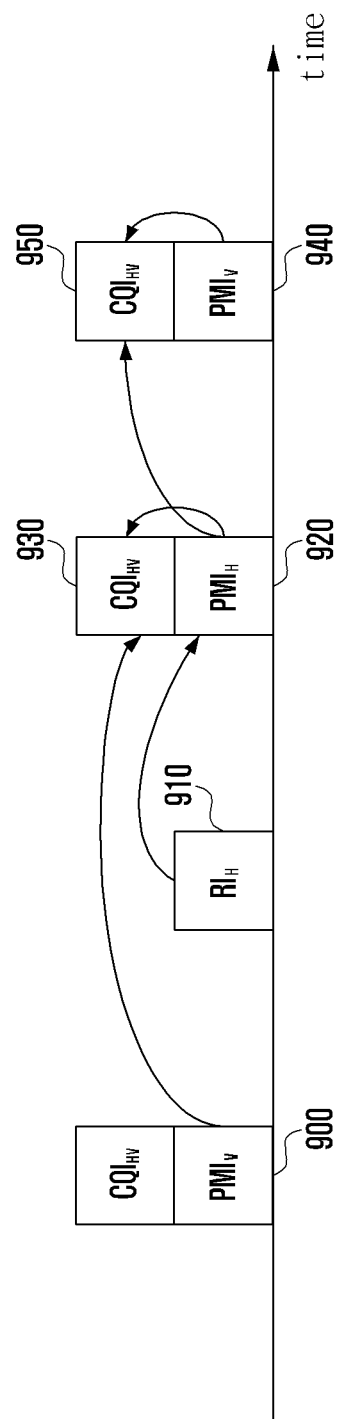
FIG. 9 is a diagram illustrating a mechanism for transmitting channel state information, according to another embodiment of the present disclosure.

FIG. 9 is a diagram illustrating a mechanism of transmitting channel state information, according to another embodiment of the present disclosure.

In the channel state information transmission method of FIG. 9, all CQI values reported from the UE to the eNB are generated under the assumption that the horizontal and vertical direction precodings are applied unlike the embodiment of FIG. 8. In FIG. 9, the UE generates $CQI_{HV}$ 930 under the assumption that the horizontal and vertical precoding matrices have been applied as indicated by $PMI_V$ 900 and $PMI_H$ 920. Specifically, the UE generates the $CQI_{HV}$ 930 transmitted along with the $PMI_H$ 920 under the assumption that both the precoding matrix indicated by the $PMI_V$ 900, as the most recently transmitted vertical direction precoding-related information, and the precoding matrix indicated by the $PMI_H$ 920 have been applied. Likewise, the UE generates $CQI_{HV}$ 950 transmitted along with $PMI_V$ 940 under the assumption that both the precoding matrix indicated by the $PMI_H$ 920, as the most recently transmitted horizontal direction precoding-related information, and the precoding matrix indicated by the $PMI_V$ 940 have been applied. The reason for referencing the previously transmitted $PMI_H$ or $PMI_V$ is to prevent a plurality of PMIs from being transmitted in one time duration.

In order to transmit $CQI_{HV}$ at every CQI transmission occasion, as shown in FIG. 9, it is necessary to restrict the rank in a specific direction. In order to change the horizontal and vertical direction ranks simultaneously, the horizontal and vertical direction precodings also have to be updated according to the changed rank values. $CQI_{HV}$ may be transmitted only after the two precodings have been updated. By taking notice of this, it is assumed that the vertical direction rank is fixed to 1 always in the embodiment of FIG. 9. Since the vertical direction rank is always 1, the vertical direction rank is not changed, such that the UE is capable of assuming that the precoding matrix indicated by the previously transmitted $PMI_V$ and the precoding matrix indicated by $PMI_V$ are applied simultaneously. Although the description is directed to the case where the vertical direction rank is fixed to 1, the present disclosure may be embodied in such a way to fix the horizontal direction rank to 1. When the horizontal direction rank is fixed to 1, the UE reports $RI_V$ at every RI transmission occasion instead of $RI_H$.

In FIG. 9, the transmission intervals of RI, horizontal direction channel state information 920 and 930, vertical direction channel state information 940 and 950, may be configured differently depending on the system environment.

Figure 10:
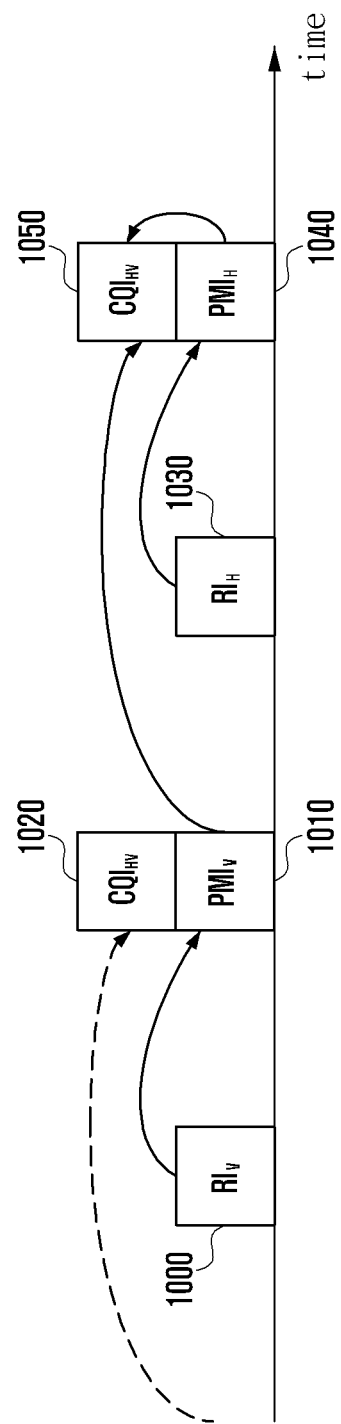
FIG. 10 is a diagram illustrating a mechanism for transmitting channel state information, according to another embodiment of the present disclosure.

FIG. 10 is a diagram illustrating a mechanism of transmitting channel state information, according to another embodiment of the present disclosure.

In FIG. 10, the UE transmits $CQI_{HV}$ under the assumption that the horizontal and vertical direction precodings are applied at every CQI transmission occasion as in FIG. 9. In the embodiment of FIG. 10, however, an extra $RI_V$ 1000 is transmitted to change the vertical direction rank. Specifically, the UE notifies the eNB of the vertical direction rank to the eNB using the $RI_V$ 1000 and reports $PMI_V$ 1010 based thereon. $CQI_{HV}$ 1020 transmitted along with the $PMI_V$ 1010 is generated under the assumption that the precoding matrix indicated by the most recently transmitted RI and PMI and the precoding matrix indicated by the $PMI_V$ 1010 are applied. When the horizontal direction rank is updated with $RI_H$ 1030, the UE updates $PMI_H$ 1040 based thereon and generates $CQI_{HV}$ 1050 under the assumption that the precoding indicated by the $PMI_V$ 1010 and the precoding indicated by the $PMI_H$ 1040 are applied simultaneously.

In FIG. 10, the UE may separately update the horizontal and vertical direction ranks. Accordingly, the UE calculates the rank to be assumed for generating the channel state information $CQI_{HV}$ 1020 and 1050 using Equation (2). If the product of the ranks indicated by the $RI_V$ 1000 and the $RI_H$ 1030 is assumed as the rank for generating the $CQI_{HV}$ 1050. Accordingly, if the product of the ranks indicated by the $RI_V$ 1000 and the $RI_H$ 1030 at the time when the $CQI_{HV}$ 1050 is transmitted is 1, the UE transmits one CQI. If the product is equal to or greater than 2, the UE transmits two CQIs.

Herein, a method for a UE to report channel state information efficiently to an eNB with a large number of transmit antennas for FD-MIMO is proposed. In order to use the channel state information, there is a need of a method for the eNB to configure the channel state information to UE. That is, the UE has to have a capability for determining whether to use a legacy method for reporting the channel state information or a new method for performing measurement on multiple CSI-RSs and reporting information, which is not conventionally supported, such as $CQI_{HV}$ as described with reference to FIGS. 8 and 9. As a method for making such a determination, the present disclosure proposes a method for a UE to make such a determination based on how the CSI process is configured.

As described above, a CSI process is performed with one CSI-RS and one IMR. Meanwhile, in order to perform measurement on multiple CSI-RSs to generate the CSI-RS as described with reference to FIG. 8 or 9, the CSI process should be performed with multiple CSI-RSs and one IMR. That is, in order to apply the channel state information report method according to an embodiment of the present disclosure, consideration may be made of a method for performing a CSI process with multiple CSI-RSs and one IMR. Given that multiple CSI-RSs should be configured per CSI process for the new channel state information report method, the UE determines whether to apply the new channel state information report method based on the number of CSI-RS configured for the CSI process. This determination method of the UE may be summarized as follows.

1. If a number of CSI-RSs configured for a CSI process is equal to or greater than 2, the new channel state information report method is applied.

2. If a number of CSI-RSs configured for a CSI process is 1, the legacy channel state information report method is applied.

A method for determining a channel state information report method based on a number of CSI-RS configured in a CSI process according to an embodiment may be summarized as follows. If the number of CSI-RSs configured in a CSI process is one, the UE performs measurement on one CSI-RS and generates and reports the corresponding CQI. If the number of CSI-RSs configured in a CSI process is two, the UE performs measurement on the two CSI-RSs and generates and reports $CQI_{HV}$. Although the $CQI_{HV}$ report is exemplified, a different channel state information report method may be determined according to a different number of CSI-RSs configured in the CSI-RS process. For example, if the number of CSI-RSs configured in a CSI-RS process is two, a method for transmitting $PMI_H$, $CQI_H$, $PMI_V$ and $CQI_V$ at preconfigured timings may be applied as in the embodiment of FIG. 6.

Figure 11:
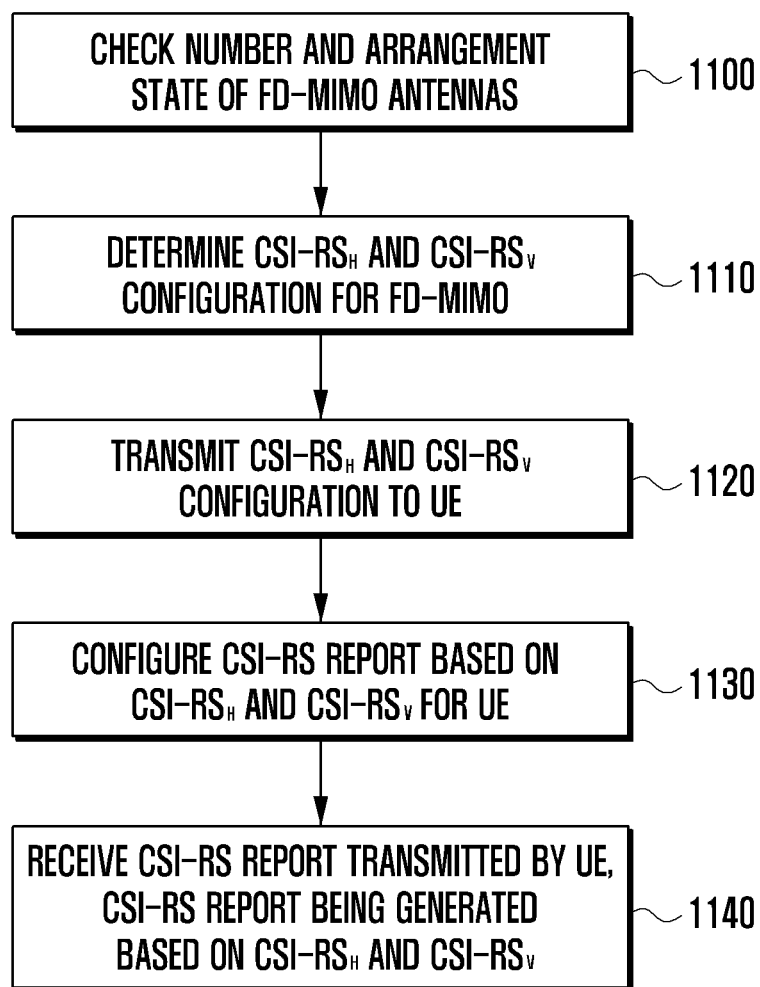
FIG. 11 is a flowchart illustrating an eNB procedure of configuring channel state information feedback of the User Equipment (UE) in a FD-MIMO system, according to an embodiment of the present disclosure.

FIG. 11 is a flowchart illustrating an eNB procedure of configuring channel state information feedback of the UE in a FD-MIMO system, according to an embodiment of the present disclosure.

In FIG. 11, the eNB checks the number of transmit antennas of the FD-MIMO transmitter and 2-dimensional arrangement state, in step 1100. The eNB determines how to configure the horizontal and vertical CSI-RSs for use in measuring the FD-MIMO channel state information, in step 1110. Although $CSI-RS_H$ and $CSI-RS_V$ are configured in an embodiment of the present disclosure, the present disclosure may be embodied in such a way of configuring a first type CSI-RS and a second CSI-RS in another format. The configuration on $CSI-RS_H$ and $CSI-RS_V$ are informed to the UE through higher layer signaling or in another method, in step 1120. The eNB notifies the UE of the feedback scheme for the UE to transmit the channel state information corresponding to the $CSI-RS_H$ and $CSI-RS_V$, in step 1130. Finally, the eNB receives the $CSI-RS_H$ and $CSI-RS_V$ transmitted by the UE, in step 1140. The eNB controls the system operation including scheduling based on the received channel state information.

Figure 12:
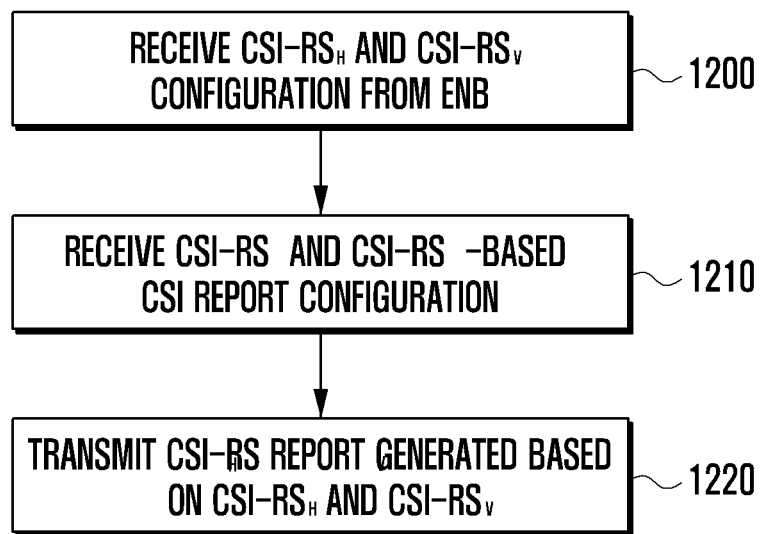
FIG. 12 is a flowchart illustrating a UE procedure for transmitting the channel state information based on the configuration indicated by the evolved Node B (eNB) in the FD-MIMO system, according to an embodiment of the present disclosure.

FIG. 12 is a flowchart illustrating a UE procedure for transmitting the channel state information based on the configuration indicated by the eNB in the FD-MIMO system, according to an embodiment of the present disclosure.

The UE receives the information on how to receive the horizontal and vertical direction CSI-RSs, i.e., $CSI-RS_H$ and $CSI-RS_V$, from the eNB. in step 1200. Although $CSI-RS_H$ and $CSI-RS_V$ are configured in an embodiment of the present disclosure, the present disclosure may be embodied in such a way of configuring a first type CSI-RS and a second CSI-RS in another format. The UE receives CSI feedback configuration information on how to measure the $CSI-RS_H$ and $CSI-RS_V$ and reports the channel state information, in step operation 1210. The UE measures the $CSI-RS_H$ and $CSI-RS_V$ and transmits channel state information according to the CSI feedback configuration information, in step 1220. The channel state information is generated and transmitted as described with reference to FIGS. 5 to 10.

Although the embodiments of FIGS. 11 and 12 are directed to an embodiment in which the eNB transmits CSI-RS and channel state information feedback configuration explicitly, the present disclosure may be embodied in such a way that the eNB notifies the UE of at least one of CSI-RS transmission position of the eNB, number of CSI-RSs, and number of ports per CSI-RS, and the UE generates and transmits the channel state information according to a feedback configuration predetermined based on the received information. It is enough for the eNB to provide the UE with the information necessary for determining the channel state information generation and transmission method.

Figure 13:
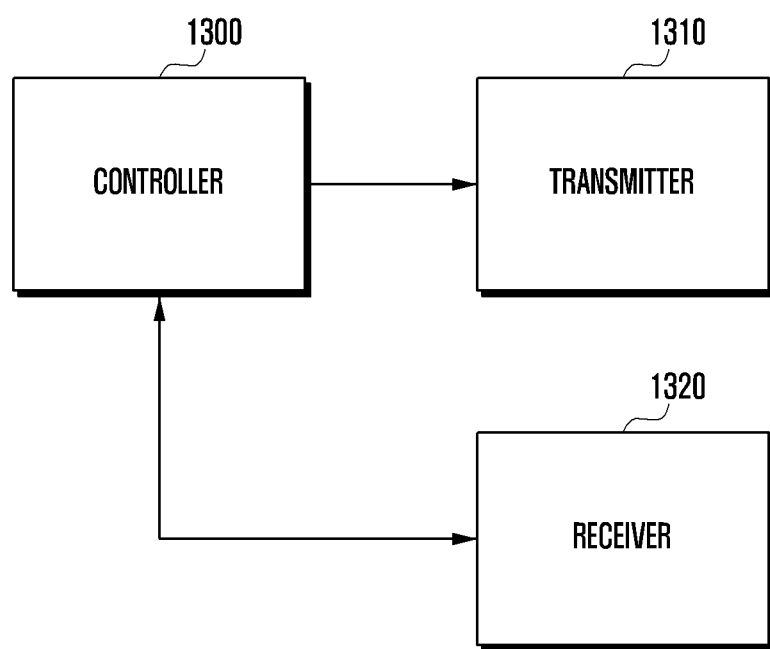
FIG. 13 is a block diagram illustrating a configuration of the eNB, according to an embodiment of the present disclosure.

FIG. 13 is a block diagram illustrating a configuration of the eNB, according to an embodiment of the present disclosure.

As shown in FIG. 13, the eNB includes a controller 1300, a transmitter 1310, and a receiver 1320. The controller 1300 determines the configuration on the plurality of CSI-RSs. The controller 1300 may determine the CSI-RS transmission scheme and the corresponding channel state information generation and feedback scheme. The transmitter 1310 transmits the determination result to the UE. The transmitter 1310 transmits the plurality of CSI-RSs to the UE. The receiver 1320 receives the channel state information corresponding to the CSI-RSs from the UE.

Figure 14:
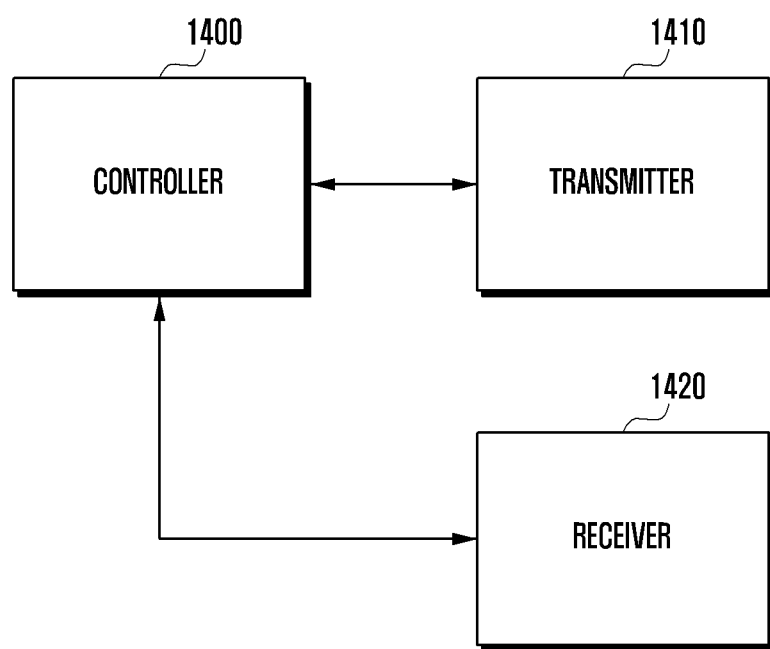
FIG. 14 is a block diagram illustrating a configuration the UE, according to an embodiment of the present disclosure.

FIG. 14 is a block diagram illustrating a configuration of the UE, according to an embodiment of the present disclosure.

A receiver 1420 receives the configuration information on the plurality of CSI-RSs, and channel state information generation and feedback scheme. A controller 1400 controls the receiver 1420 to receive the plurality of CSI-RSs transmitted by the eNB. The controller 1400 generates channel state information based on the plurality of CSI-RSs. The controller 1400 controls a transmitter 1410 to transmit the channel state information to the eNB.

As described above, the channel state information feedback method of the present disclosure is capable of transmitting/receiving channel state information efficiently in a wireless system using a plurality of antennas.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to embodiments of the present disclosure, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

While the invention has been shown and described with reference to certain embodiments thereof, it will be understood by those skilled in the art that various changes in form and detail may be made therein without departing form the spirit and scope of the invention as defined by the appended claims.

What is claimed is:

1. A method for reporting channel state information (CSI) performed by a terminal in a communication system, the method comprising:
receiving, from a base station, CSI configuration information including configurations on a first channel state information reference signal (CSI-RS), a second CSI-RS, and a CSI interference measurement (CSI-IM) and configuration for a CSI feedback associated with the first CSI-RS, the second CSI-RS and the CSI-IM;
receiving, from the base station, the first CSI-RS and the second CSI-RS based on the configurations on the first CSI-RS and the second CSI-RS;
generating the CSI based on the configuration for the CSI feedback, and the first CSI RS, the second CSI-RS and the CSI-IM; and
reporting, to the base station, the CSI including at least one of a rank indicator (RI), a precoding matrix indicator (PMI), or a channel quality indicator (CQI),
wherein the first CSI-RS and the second CSI-RS are non-zero power CSI-RSs, and
wherein the CSI configuration information includes information on RI restriction which is associated with allowable RIs to be reported.

2. The method of claim 1, wherein the CSI-IM is a resource for measuring an interference associated with the CSI.

3. The method of claim 1, wherein the configuration for the CSI feedback includes information on a CSI feedback among a plurality of CSI feedbacks.

4. The method of claim 1, wherein the configurations on the first CSI-RS and the second CSI-RS indicate CSI-RSs among a plurality of CSI-RSs.

5. The method of claim 4, wherein configuration on the plurality of CSI-RSs comprises antenna ports and resource allocation of each CSI-RS.

6. A method for receiving channel state information (CSI) performed by a base station in a communication system, the method comprising:
transmitting, to a terminal, CSI configuration information including configurations on a first channel state information reference signal (CSI-RS), a second CSI-RS, and a CSI-interference measurement (CSI-IM) and configuration for a CSI feedback associated with the first CSI-RS, the second CSI-RS, and the CSI-IM;
transmitting, to the terminal, the first CSI-RS and the second CSI-RS; and
receiving the CSI including at least one of a rank indicator (RI), a precoding matrix indicator (PMI), or a channel quality indicator (CQI),
wherein the CSI is associated with the configurations for the CSI feedback, and the first CSI-RS, the second CSI-RS, and the CSI-IM, and
wherein the CSI configuration information includes information RI restriction which is associated with allowable RIs to be reported.

7. The method of claim 6, wherein the CSI-IM is a resource for measuring an interference associated with the CSI.

8. The method of claim 6, wherein the configuration for the CSI feedback includes information on a CSI feedback among a plurality of CSI feedbacks.

9. The method of claim 6, wherein the configurations on the first CSI-RS and the second CSI-RS indicates CSI-RSs among a plurality of CSI-RSs.

10. The method of claim 9, wherein configuration on the plurality of CSI-RSs comprises antenna ports and resource allocation of each CSI-RS.

11. A terminal for reporting channel state information (CSI) performed in a communication system, the terminal comprising:
a transceiver; and
a controller connected with the transceiver and configured to:
receive, from a base station via the transceiver, CSI configuration information including configurations on a first channel state information reference signal (CSI RS), a second CSI-RS, and a CSI-interference measurement (CSI-IM) and configuration for a CSI feedback associated with the first CSI-RS, the second CSI-RS, and the CSI-IM;
receive, from the base station, the first CSI-RS and the second CSI-RS based on the configurations on the first CSI-RS and the second CSI-RS;
generate the CSI based on the configuration for the CSI feedback, and the first CSI-RS, the second CSI-RS, and the CSI-IM; and
report, to the base station, the CSI including at least one of a rank indicator (RI), a precoding matrix indicator (PMI), or a channel quality indicator (CQI),
wherein the first CSI-RS and the second CSI-RS are non-zero power CSI-RSs, and
wherein the CSI configuration information includes information on RI restriction which is associated with allowable RIs to be reported.

12. The terminal of claim 11, wherein the CSI-IM is a resource for measuring an interference associated with the CSI.

13. The terminal of claim 11, wherein the configuration for the CSI feedback includes information on a CSI feedback among a plurality of CSI feedbacks.

14. The terminal of claim 11, wherein the configurations on the first CSI-RS and the second CSI-RS indicates CSI-RSs among a plurality of CSI-RSs.

15. The terminal of claim 14, wherein configuration on the plurality of CSI-RSs comprises antenna ports and resource allocation of each CSI-RS.

16. A base station for receiving channel state information (CSI) in a communication system, the base station comprising:
a transceiver; and
a controller connected with the transceiver and configured to:
transmit, to a terminal via the transceiver, CSI configuration information including configurations on a first channel state information reference signal (CSI-RS), a second CSI-RS, and a CSI-interference measurement (CSI-IM) and configuration for a CSI feedback associated with the first CSI-RS, the second CSI-RS, and the CSI-IM;
transmit, to the terminal, the first CSI-RS and the second CSI-RS; and
receive, from the terminal, the CSI including at least one of a rank indicator (RI),
a precoding matrix indicator (PMI), or a channel quality indicator (CQI),
wherein the CSI is associated with the configurations for the CSI feedback, and the first CSI-RS, the second CSI-RS, and the CSI-IM, and
wherein the CSI configuration information includes information RI restriction which is associated with allowable RIs to be reported.

17. The base station of claim 16, wherein the CSI-IM is a resource for measuring an interference associated with the CSI.

18. The base station of 16, wherein the configuration for the CSI feedback includes information on a CSI feedback among a plurality of CSI feedbacks.

19. The base station of claim 16, wherein the configurations on the first CSI-RS and the second CSI-RS indicates CSI-RSs among a plurality of CSI-RSs.

20. The base station of claim 19, wherein configuration on the plurality of CSI-RSs comprises antenna ports, and resource allocation of each CSI-RS.

* * * * *